L. T. BANKS.
GATE AND DOOR FASTENER.
APPLICATION FILED JAN. 12, 1915.
1,153,010.
Patented Sept. 7, 1915.
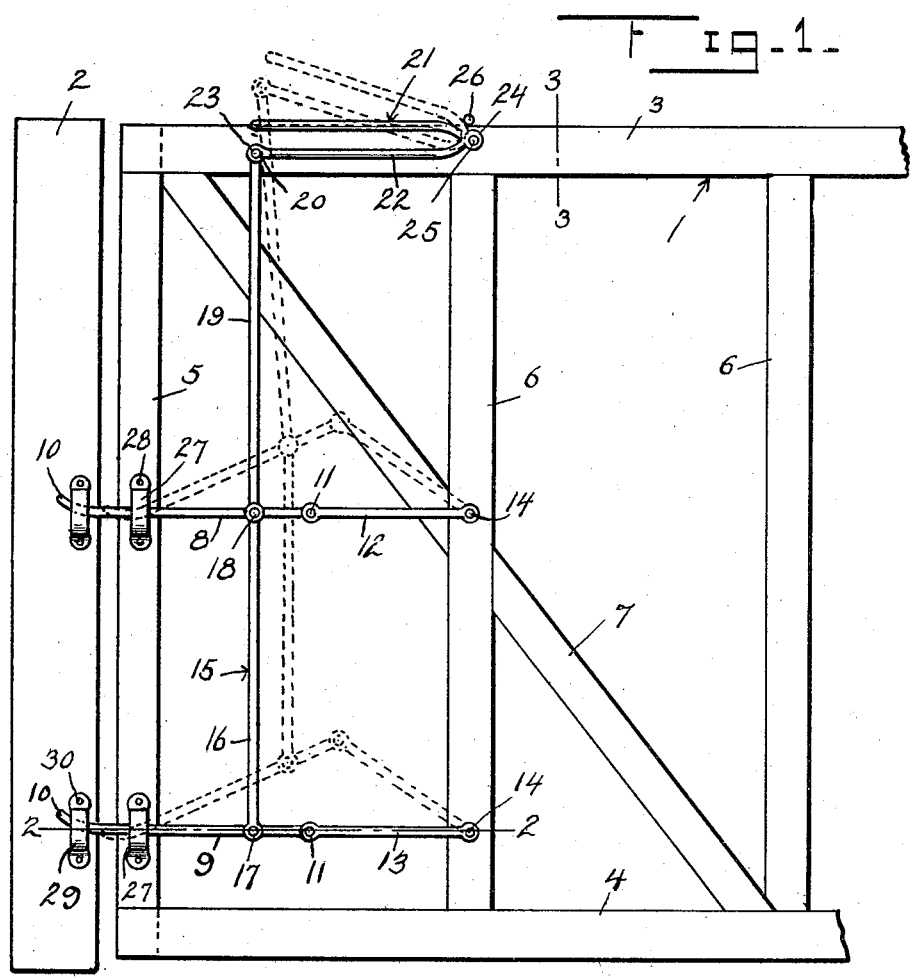
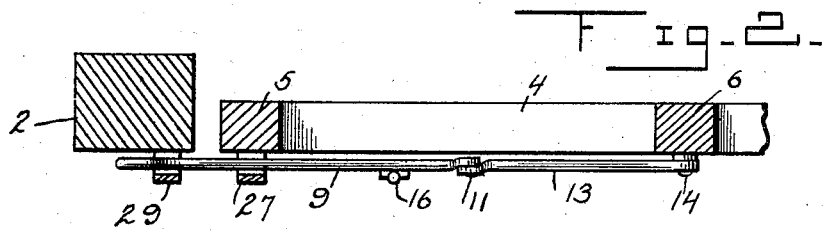
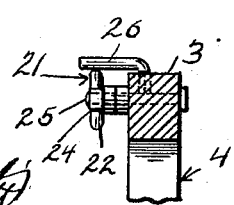
Inventor
L. T. Banks.
Witnesses
By
Attorney

UNITED STATES PATENT OFFICE.

LYNN T. BANKS, OF KAHOKA, MISSOURI.

GATE AND DOOR FASTENER.

1,153,010.  Specification of Letters Patent.  Patented Sept. 7, 1915.

Application filed January 12, 1915. Serial No. 1,853.

*To all whom it may concern:*

Be it known that I, LYNN T. BANKS, a citizen of the United States, residing at Kahoka, in the county of Clark and State of Missouri, have invented certain new and useful Improvements in Gate and Door Fasteners; and I do hereby declare the following to be a full, clear, and exact description of the invention, such as will enable others skilled in the art to which it appertains to make and use the same.

This invention relates to new and useful improvements in gates and door fasteners, and has for its principal object to provide a device which is not easily opened by animals.

Another object of the invention is to provide a device which may be easily and quickly opened by lifting the handle.

A further object of the invention is to provide a fastener which is capable of holding a gate against opening either at the top or bottom thereby preventing animals from entering places where they are prohibited.

With these and other objects in view, the invention consists in the novel combination and arrangement of parts which will be fully set forth in the following specification and accompanying drawings, in which—

Figure 1 is a fragmentary view of a gate showing this improved fastener applied thereto and illustrating in dotted lines the device as it would appear when in position to release the gate, Fig. 2 is a horizontal sectional view taken on line 2—2 of Fig. 1, and Fig. 3 is a sectional view taken on the line 3—3 of Fig. 1.

Referring now to the drawing, by characters of reference, the numeral 1 designates as an entirety the gate or door of the ordinary construction, while the numeral 2 designates a gate post. This gate comprises the usual upper and lower bars 3 and 4, respectively which are connected by the usual end bars 5 and intermediate bars 6. A suitable brace bar 7 may be secured between any two of the bars and is designed to prevent the gate from sagging.

The latch mechanism comprises the upper and lower bolts 8 and 9, respectively, each of which is upturned at its free end as at 10 and these upturned ends are designed to engage the keepers, which will be more fully hereinafter described. Pivotally secured as at 11 to the ends of the bolts 8 and 9 opposite the upturned portion 10 are the links 12 and 13 respectively which are pivotally secured as at 14 to the intermediate bars 6 adjacent one of the end bars 5.

The operating rod designated by the numeral 15 comprises the lower link 16 which is pivotally secured as at 17 to the bolt 9 at a point near the pivot 11 and to the bolt 8 as at 18 at a point near the pivot 11. The upper section of the bar comprises the link 19 which is pivotally secured to the pivot 18 and pivoted at its upper end as at 20 to the operating element designated generally by the numeral 21. This operating element comprises the U-shaped body 22, one of the arms of which is pivotally secured at its end as at 23 to the upper end of the link 19. The bite portion of the U-shaped operating member is provided with a suitable eye 24 which is designed to receive the pivot pin 25 and thus pivotally hold the U-shaped member in place. In order to limit the upward movement of the U-shaped member there is provided a suitable stop 26 which engages one of the arms and prevents the same moving beyond a predetermined point. In order to hold the locking bolts 8 and 9 in proper position, there are provided the U-shaped guides 27 which are screwed or otherwise secured as at 28 to the end bar of the gate or door. Each of these U-shaped guide members 27 is located in such position as to form a guide for the bolts 8 and 9 and are arranged to aline with the keepers 29 which are screwed or otherwise secured as at 30 to the gate posts 2.

It will be apparent from the foregoing that in use when the gate is in its locked position the bolts 8 and 9 extend beneath the keepers as clearly shown in Fig. 1 and the links 12 and 13 are respectively in direct alinement with the bolts 8 and 9. When it is desired to open the gate, the user pulls upwardly on the U-shaped operating member 21 which will cause the bar 15 to rise, as clearly illustrated by the dotted lines in Fig. 1 and thereby withdraw the bolts from the keepers. Upon reaching the upward limit of travel, it will be apparent that the operating member will engage the stop and thus prevent the ends 10 of the bolts from being withdrawn beyond the retaining members 27.

While in the foregoing there has been shown and described the preferred embodiment of this invention, it is to be understood that such changes may be made in the combination and arrangement of parts as will fall within the spirit and scope of the invention as defined in the appended claims.

What is claimed is:—

1. The combination with a gate, and a gate post, a keeper carried by the gate post, an operating element pivotally secured to the top portion of said gate, a rod pivotally connected to one end of the operating element and extending downwardly therefrom, bolts having curved ends secured to said operating rod intermediate their ends, links pivotally secured to the gate, their free ends being pivotally secured to the ends of the bolts whereby on upward movement of the operating element the operating rod will be drawn upwardly and inwardly owing to the pivotal action of the bolt, thereby drawing the curved portion of the bolt away from the keeper.

2. The combination with a gate and a gate post, keepers arranged to be carried by the gate post, a U-shaped operating element secured to the upper portion of said post, an operating rod pivotally secured to one of the arms of the U-shaped operating element, a plurality of bolts pivotally secured to the operating rod intermediate their ends, said bolts having one of their ends curved to engage the keeper of the gate post, links pivotally secured to the gate, their free ends pivotally secured to the free ends of the bolts whereby upon upward movement of the U-shaped operating element the operating rod will be drawn upwardly and inwardly owing to the pivotal motion of the links and bolts and thereby withdraw the curved portion of the bolts from the keepers.

In testimony whereof I have affixed my signature in presence of two witnesses.

LYNN T. BANKS.

Witnesses:
 ED C. WAPLES,
 JOHN W. WALKER.

Copies of this patent may be obtained for five cents each, by addressing the "Commissioner of Patents, Washington, D. C."